United States Patent [19]

Kai et al.

[11] Patent Number: 5,272,190

[45] Date of Patent: Dec. 21, 1993

[54] RUBBER COMPOSITION CONTAINING POWDERED LEATHER AND MOLDING PRODUCTS

[75] Inventors: Haruki Kai, Ichihara; Takao Inokuchi, Tokyo; Tohru Nishi, Ichihara, ali of Japan

[73] Assignee: Idemitsu Petrochemical Co., Ltd., Tokyo, Japan

[21] Appl. No.: 776,076

[22] Filed: Oct. 11, 1991

[30] Foreign Application Priority Data

Oct. 15, 1990 [JP] Japan .................. 2-276733

[51] Int. Cl.$^5$ .......................... C08L 89/06; C14C 1/00
[52] U.S. Cl. ....................... 524/11; 8/94.18; 8/94.21
[58] Field of Search ................ 524/11; 8/94.18, 94.21

[56] References Cited

U.S. PATENT DOCUMENTS

| 290,909 | 12/1883 | Mitchell | 524/11 |
| 894,334 | 7/1908 | Lewis | 524/11 |
| 4,834,762 | 5/1989 | Nishibori | 524/11 |

FOREIGN PATENT DOCUMENTS 0256663 2/1988 European Pat. Off. .
0456264 11/1991 European Pat. Off. .
4005493 8/1990 Fed. Rep. of Germany .

OTHER PUBLICATIONS

World Patents Index Latest—Abstract for Appln. No. 91-249210 (Japanese Pat. No. 3 162 500, issued Jul. 12, 1991).

*Primary Examiner*—Paul R. Michl
*Assistant Examiner*—Lavonda DeWitt
*Attorney, Agent, or Firm*—Flynn, Thiel, Boutell & Tanis

[57] ABSTRACT

A rubber composition containing a powdered leather of a dispersion mixture comprising from 10 to 400 parts by weight of a powdered leather with a skin component of greater than 75% by weight, a total amount of Na$^+$ ions and Ca$^{2+}$ ions extractable with water of less than 0.5% by weight and an average grain size $D_{50}$ of from 10 μm to 250 μm, and 100 parts by weight of rubber obtained from a raw material for the powdered leather by performing coarse pulverization, water washing, dewatering, steams swelling, drying and powderization and then separation into particles of a desired average grain size depending on the purpose of use, as well as a molding product obtained from the rubber composition.

10 Claims, No Drawings

RUBBER COMPOSITION CONTAINING POWDERED LEATHER AND MOLDING PRODUCTS

BACKGROUND OF THE INVENTION

1. Field of the Invention

The present invention concerns a rubber composition containing a powdered leather and molding products obtained therefrom, which can be utilized for sports goods such as grips for tennis rackets, badminton rackets, golf clubs and baseball bats, wearing goods such as gloves, raincoats and caps made of rubber, vehicle parts such as grips for handle bars of motorcycles, window frame rubbers, wiper rubber, rubber vibration insulators, braking rubber, grips for shift levers, interior automotive trims and tires, building materials such as anti-slip members and sound absorbers, shoe goods such as rubber shoes and shoe soles, as well as domestic electric products, writing utensils, furniture and musical instruments.

2. Description of the Related Art

In the rubber composition containing a natural powdered leather and the molding product obtained by the prior art as described above, however, white powder is formed on the surface during use or storage for a long period of time, in particular, after being left for a long period of time in a highly humid atmosphere, to deteriorate the performance and the quality (appearance) of goods. In particular, if a natural powdered leather of small grain size, for example, of less than 250 μm is used, the white powder comes out remarkably.

Further, in the case of fabricating grips of sports goods by using the rubber composition containing a natural powdered leather with a small average grain size, for example, of less than 10 μm, if the surface of the grip is polished for enhancing the shape of the surface, there is a problem that the moisture absorption of the powdered leather is somewhat reduced and the anti-slip effect is decreased though the powder content is identical, to worsen the overall balance of characteristics.

An object of the present invention is to provide a rubber composition containing a powdered leather and a molding product free from occurrence of the white powder and having excellent enduring performance and quality.

In accordance with the present invention, it is intended to achieve the foregoing object, in producing a molding product by using a rubber composition containing a powdered leather, while taking notice on the fact that occurrence of the white powder is prevented by using a fine powdered leather of a specific grain size and with less impurity.

The rubber composition containing a powdered leather according to the present invention is a dispersion mixture comprising from 10 to 400 parts by weight of a powdered leather with a skin component of greater than 75% by weight, a total amount of $Na^+$ ions and $Ca^{2+}$ ions extractable with water of less than 0.5% by weight and with an average grain size $D_{50}$ from 10 to 250 μm, and 100 parts by weight of a rubber.

The rubber molding product containing a powdered leather according to the present invention is formed by using, as the main ingredient, the rubber composition containing the powdered leather as described above.

The rubber composition containing the powdered leather and the molding product according to the present invention basically comprises a rubber and a powdered leather dispersed therein in a dot-like pattern.

In the composition and the molding product of the aforementioned type, the amounts of the powdered leather material and the rubber material used are from 10 to 400 parts by weight and 100 parts by weight respectively. If the ratio of the powdered leather exceeds 400 parts by weight, it makes the kneading and stirring difficult in the composition, to render it impossible for homogeneous dispersion thereby embrittling the molding product. On the contrary, if it is less than 10 parts by weight, the addition effect, that is, the moisture absorbing/releasing property or the like becomes insufficient.

The reasons for defining the values for the properties of the powdered leather in the composition and the molding product according to the present invention will be shown below.

(1) Skin Component of Greater than 75% by Weight

A high content of the skin component means that the amount of impurities is small, as well as that it provides an important factor for improving the state of surface, feeling upon touching, etc. of products, for example, rubber grips and rubber gloves mixed with such a component. That is, as the amount of the skin component is increased, the surface state or the like of the product can be improved effectively with lesser amount of the powder.

(2) The Total Amount for Water Extractable Free Ions ($Na^+$, $Ca^{2+}$) of Less than 0.5% by Weight If the amount of free ions extractable with water is large among impurities derived from the raw material for leather, the resultant product undergoes the effect of humidity, heat or the like, and salts of them (for example, $NaCl$, $Na_2SO_4$ and $CaSO_4$) bleed out to the surface of the product, thereby worsening the appearance of the product.

As the free ions extractable with water, there are also present anions such as $Cl^-$ and $SO_4^{2-}$ in addition to the cations of $Na^+$ and $Ca^{2+}$. However, since the bleed out results only in the form of salts of pair ions of such ions, the amount is defined as the total amount for $Na^+$ and $Ca^{2+}$ as the cations of smaller amount.

(3) Average Grain Size $D_{50} = 10$ to 250 μm

If the average grain size of the powdered leather is less than 10 μm, the moisture absorbing/releasing property is reduced and, in particular, no sufficient anti-slip effect can be obtained when the molding product is polished. On the other hand, if it exceeds 250 μm, it results in defects due to poor dispersion and deterioration of a feeling which the surface gives (a feeling of being gritty or uneven).

If gelatin is used instead of the powdered leather, the surface becomes undesirably sticky.

Oils and fats in the powdered leather have a concern with odors of the molding product. However, since the composition and the molding product according to the present invention contain the rubber material which emits a rather intense odor of rubber, degreasing of the powdered leather is not always necessary. However, since it is possible to reduce offensive odors caused, for example, by thermal denaturation of the oils and fats in the powdered leather, and restrain the deterioration of the surface feeling due to pigmentation and bleed out if the oils and fats in the powdered leather are decreased by degreasing, degreasing is preferably applied to less than 2% by weight and, more preferably, to less than 0.5% of the oils and fats.

The characteristic values are measured by the methods shown below.

(A) Skin component:
  According to JIS K6550-1976 "Leather Test Method" 6.7

(B) Total amount for free ions ($Na^+$, $Ca^{2+}$) extractable with water

Ten grams of dry powdered leather was stirred in 100 ml of purified water over one day and one night to extract free ions in the powdered leather. Quantities of $Na^+$ and $Ca^{2+}$ in the liquid extract were determined by atomic absorption spectroscopy and it is determined as the extraction amount from the powdered leather.

(C) Average grain size:
  Several milligrams of powdered leather were dispersed into 100 ml of methanol and distribution of particles was measured by a coaltar counter (manufactured by Coaltar Electronics Co.) to determine the average grain size.

The range for the density of the powdered leather measured after drying the powdered leather at 120° C. for 2 hours in accordance with JIS K6721 is usually greater than 0.38 g/cc. This is because the leather, if the density is too low, powder becomes fibrous or much thin hair is formed, making it difficult for homogeneous dispersion with rubber.

The powdered leather used in the present invention can be obtained, for example, by putting the raw material for the powdered leather to coarse pulverization, washing with water, dewatering, steam swelling, drying and fine pulverization. Subsequently, a classifying step may be applied, if required, to separate a powdered leather of an average grain size depending on the purpose of use. Further, for degreasing the powdered leather, the steps of drying, solvent-degreasing, removal of the residual solvent and so on may be interposed between the steps of the coarse pulverization and the water washing.

Referring more specifically to the production process, the raw material of the powdered leather is at first pulverized coarsely so as to have a grain size of less than about 10 mm for facilitating the fine pulverization in the subsequent step by using a coarse pulverizer such as a jaw crusher, a cutter mill or a hammer crusher. The thus obtained coarsely pulverized powdered leather usually contains from 40 to 60% by weight of water.

As the raw material for the powdered leather, shavings or sprits can be used for instance.

Subsequently, a series of water washing procedures including a water washing step and a dewatering step are applied mainly for extracting and removing free ions ($Na^+$, $Ca^{2+}$) in the leather and for possessing a predetermined water content in the coarse powder.

A series of water washing procedures can effectively be applied batchwise repeatedly for several times. For instance, a method of supplying a predetermined amount of water to the coarse powder after removing the solvent, applying agitation for a desired period of time and, if necessary, air bubbling and then applying dewatering is repeated, usually for several times and, preferably, for 3 to 4 times depending on the amount of water supplied. Dewatering is usually applied by filtration (draining or dripping) for the simplicity of the procedures but centrifugal dewatering or like other method may also be used.

Continuous water washing procedures may also be used although a great amount of water is required and hence it is not considered so advantageous.

The water temperature may be a normal temperature and, preferably, lower than 30° C.

In the series of the water washing procedures described above, a water containing coarse powder with the total amount for the free $Na^+$ ions and $Ca^{2+}$ ions of less than 0.5% by weight (on the dry weight basis) and the water content usually of 65 to 70% is obtained. By the series of the water washing procedures, the coarse powder finally possesses a predetermined amount of water content usually from 65 to 75%.

Accordingly, it is only necessary for this method to confirm the water content of the coarse powder after dewatering and it has a merit of virtually saving a moisture controlling step of supplying water to the coarse powder, after the removal of the solvent, until a predetermined water content is reached, as employed conventionally.

A predetermined amount of water is possessed in or supplemented to the coarse powder for the following reasons. That is, powderization can not be obtained in a dry state even when fine powderization is conducted after steam digestion in the succeeding step. However, when a coarse powder containing water and thus in a swollen state is steam-digested, it is partially denatured by heat and tightened hard upon drying into a state to be easily pulverized and powderized.

Then, for facilitating the powderization in the succeeding step, swelling treatment by steam (steam-digestion) is applied under stirring to the coarsely pulverized powdered leather after dewatering.

Subsequently, for facilitating powderization in the subsequent step, the coarse by pulverized powdered leather after the swelling treatment is dried to a water content of less than about 3% by weight. The drying step is usually applied in a combination of preliminary drying by a drier and main drying by a vacuum drier.

Then, the coarsely pulverized powdered leather after drying was powderized to an average grain size from 10 to 250 μm by using a dry powderizer such as a victory mill, a ball mill, a colloid mill, a jet mill, a roller mill and a hammer mill.

Then, the resultant powderized powdered leather having a broad grain size range may be classified, as required, into various average grain sizes in accordance with the purpose of use by using a gravitational classifier, an inertia type classifier, a centrifugal classifier such as a cyclone- or a micron separator and a sieving machine.

For degreasing the powdered leather, each of the following steps is interposed between the steps of coarse pulverization and water washing, for instance.

That is, for facilitating the degreasing (removal of oils and fats) in the subsequent step, the water containing coarse powder is dried to a water content of about 20 to 30% by weight.

Then, the dried coarse powder is degreased by using an appropriate solvent to the content of oils and fats preferably of less than 2% by weight and, more preferably, less than 0.5% by weight. As the degreasing solvent, for example, n-hexane, benzine, methylene chloride, acetone, ethyl acetate or toluene may be used.

Subsequently, for removing the residual solvent in the coarse powder, the coarse powder after degreasing is subjected to heat treatment. Since steams are usually used as a heat source in view of safety, the step is referred to also as steam purging. As other heat source, heated nitrogen, heated air or the like may be also used.

In the degreasing method described above, a series of water washing procedures are applied after the degreasing step, but the water washing procedures may be applied before the degreasing or after the powderization.

As the rubber used in combination with the powdered leather obtained as described above, for example, synthetic rubber such as diene series (butadiene-styrene, butadiene-acrylonitrile), polysulfide series (Thiokol), olefinic series (ethylene-propylene, chlorosulfonated polyethylene), organic silicone compound series, fluoro-containing compound series, urethane series and vinyl series, as well as natural rubber may be mentioned.

The above-mentioned various kinds of synthetic and/or natural rubber may be used alone or as a mixture of a plurality of them.

In the composition according to the present invention, additives usually employed in the relevant field of the art, for example, vulcanizers, vulcanization accelerator vulcanizing acceleration aids, processing aids, as well as coloring agents such as dyes or pigments, UV-absorbers and aging inhibitors can be added, optionally, in a required amount depending on the purpose of modification, quality stabilization, etc., the purpose of uses and working circumstances.

In this case, as the vulcanizer, sulfur materials such as powdered sulfur, insoluble sulfur and surface treated sulfur; metal oxides such as magnesium oxide or zinc oxide (for CR, SSM, T); quinoid vulcanizers; peroxide vulcanizers; amine vulcanizer; resin vulcanizer; and organic sulfur vulcanizers can be mentioned.

As the vulcanization accelerator, for example, zinc dithiocarbamate and heterocyclic mercaptan may be used.

As the vulcanizing accelerator aid, for example, a zinc oxide powder or stearic acid.

As the processing agent, for example, stearic acid, polyethylene glycol and paraffin wax may be used.

As the UV-ray absorber, for example, salicylic acid ester series such as phenyl salicylate; benzotriazole series such as 2-hydroxyphenyl benzotriazole; and hydroxy benzophenone series such as 2-hydroxy benzophenone, 2-hydroxy-4-methoxybenzophenone, 2-hydroxy-4-octoxybenzophenone, 2,2'-dihydroxy-4-methoxy-benzophenone may be used.

For producing the rubber composition containing the powdered leather and the molding product according to the present invention by using the above-mentioned materials, usual mixing methods may be used but the following procedures may also be used instead.

Finely slit rubber was melted, for example, in a banbury mixer previously controlled to a temperature of 30° to 60° C. and a powdered leather is admixed, or both of the starting materials are simultaneously charged into and mixed in the mixer.

The mixture is further molded into a sheet at 30°-40° C. on a twin roll to obtain a sheeted molding product, or the mixture is cast or deposited in a predetermined die to obtain a molding product of a predetermined shape.

Further, in the case of using a liquid rubber, the liquid rubber and the powdered leather are mixed by a stirring blade or the like.

A typical molding method usable herein may include, for example, injection molding, inflation (blow) molding, compression molding, rotary molding and powder slush molding.

For kneading the powdered leather with the rubber, an extruder, a kneading roll or the like may be used in addition to the banbury mixer. As the raw material for the rubber, rubber cut into blocks, as well as pellet or powdery rubber may be used.

DETAILED DESCRIPTION OF THE PREFERRED EMBODIMENT(S)

The present invention will now be described more in details referring to examples.

Description will be made at first to the method of preparing the powdered leather.

After disintegrating 1200 kg mass of chrome tanned hide wastes (shavings) by a disintegrator (manufactured by Hosokawa Micron Co.) into the shape of the original shavings (Max: 1 cm width × 12 cm length), they were successively fed into a coarse pulverizer (hammer mill, manufactured by Odate Co.: 600 kg/Hr of performance) and formed into a coarsely pulverized powdered leather with a grain size of less than about 10 mm. The coarse powder had a water content from 40 to 60% by weight.

Subsequently, it was degreased for obtaining a better powdered leather and degreasing was conducted as described below.

Namely, 350 kg of a moistened coarsely pulverized powdered leather was put into a vacuum drier and dried to a water content from 20 to 30% by weight. Successively, 270 kg of the dried coarsely pulverized powdered leather was charged into a degreasing machine and degreased under stirring and extraction for one hour and 15 min while feeding n-hexane at a rate of 100 l/min and then it was filtered. The content of the residual oils and fats in the resultant degreased coarse powder was less than 0.5% by weight.

Then, the residual solvent in the coarsely pulverized degreased powdered leather was purged with steam of 2 $kg/cm^2G$ at a temperature of 130° C. till the odor of the solvent (hexane) was eliminated to thereby complete the steps relevant to the degreasing.

After supplying 2 $m^3$ of water at a normal temperature to the degreasing machine and stirring for 30 min, it was drained by filtration. The batchwise water washing procedure was repeated for four cycles in total to remove free ions such as metal ions and water soluble ingredients in the leather wastes. The coarsely pulverized powdered leather after filtration and draining contained from 65 to 75% by weight of water.

Then, the thus treated powdered leather was transferred to a steam digester with no moisture being conditioned and digested under stirring with steam of 2 $kg/cm^2G$ at 130° C. for 45 min.

Then, after preliminarily drying the coarsely pulverized powdered leather after digestion to a water content of 30 to 40% by a drier maintained at 90° C. for 3 hours, it was dried by a vacuum drier at 45° C. for 8 hours to obtain 190 g of a dried coarsely pulverized powdered leather with a water content of less than 1% by weight.

Then, the dry powdered leather was powderized for 2 hours at 1700 rpm by a fine victory mill (manufactured by Hosokawa Micron Co.).

Subsequently, the powderized leather was classified by a cyclone classifier to obtain 35 kg of a fine powdered leather with an average grain size $D_{50}$=about 30 $\mu m$ and 155 kg of a coarse powdered leather with an average grain size $D_{50}$=about 60 $\mu m$.

Production of Molding Product

Example 1

Each 50 parts by weight of natural rubber (#3) and 50 parts by weight of EPDM (ethylene - propylene - diene - methylene - linkage; Keltan 314, manufactured by Idemitsu DSM Co.) was cut into a block of about 3 cm square, melted in a banbury mixer heated to about 40° C., to which a protein powder with an average grain size of 60 μm, among 50 parts of the natural powdered leather obtained by the above-mentioned processing, was admixed.

The kneading product was further formed into a sheet about 1 cm thick by a twin roll at about 50° C. and then allowed to cool spontaneously.

The mixture sheet was used and pressed at 150° C. for 5 min to mold a plate sized 150 mm long × 200 mm wide × 2 mm thick.

The mixture sheet was subjected to a moisture proof test and examined for powder falling at the cut-end (detachment of the powdered leather from the molding product) and, further, the molding product was measured for the moisture absorption and the dynamic friction coefficient. The molding plate the surface of which was polished away by about 20 μm was also measured for moisture absorption and dynamic friction coefficient.

Example 2

The mixture sheet and the molding product were evaluated in the same manner as in Example 1 except for using a natural powdered leather with an average grain size of 30 μm obtained by the processing as described above in which the step of drying before degreasing and the step of deodorization by degreasing and steam were saved.

Example 3

The mixture sheet and the molding product were evaluated in the same manner as in Example 1 except for using 100 parts by weight of synthetic rubber EPDM (Keltan 314, manufactured by Idemitsu DSM Co.) alone as the rubber.

Example 4

The mixture sheet and the molding product were evaluated in the same manner as in Example 1 except for using 100 parts by weight of a natural rubber alone as the rubber.

Example 5

The procedures employed were the same as those in Example 1 except for using 80 parts of natural rubber and 20 parts of synthetic rubber EPDM as the rubber and using 25 parts by weight of the natural powdered leather (average grain size of 30 μm) which was subjected to the foregoing treatment.

Example 6

100 parts by weight of a pellet-like synthetic rubber (silicone rubber) and 50 parts by weight of the natural powdered leather (average grain size of 30 μm) which was subjected to the foregoing treatment were homogeneously mixed by a twin roll at 150° to 160° C. to obtain a sheet-shaped mixture, which was further molded in a press molding machine to prepare a sheet-like molding product 2 mm thick (150 mm × 150 mm) under heating to about 180° C., and the moisture-proof test and a measurement of moisture absorption and dynamic friction coefficient were conducted in the same manner as in Example 1.

Example 7

The procedures were the same as those in Example 1 except for using 20 parts by weight of natural rubber, 80 parts by weight of synthetic rubber EPDM and 350 parts by weight of the natural powdered leather (average grain size of 60 μm) which was subjected to the foregoing treatment.

Comparative Example 1

A mixture sheet and a molding plate were prepared in exactly the same manner as in Example 1 except for using a natural powdered leather (average grain size of 60 μm) not subjected to water washing treatment, and he resultant sheet and plate were evaluated.

Comparative Example 2

The mixture sheet and the molding plate were evaluated in exactly the same manner as in Example 3 except for using natural powdered leather (average grain size of 30 μm) not subjected to the water washing treatment.

Comparative Example 3

The mixture sheet and the molding plate were evaluated in exactly the same manner as in Example 3 except for using a natural powdered leather with a small average grain size (average grain size of 5 μm).

Comparative Example 4

The mixture sheet and the molding plate were evaluated in exactly the same manner as in Example 3 except for using a natural powdered leather with a large average grain size (average grain size of 300 μm).

Comparative Example 5

When the same natural powdered leather (average grain size of 60 μm) as in Example 1 was added by 450 parts by weight to 80 parts by weight of a natural rubber and 20 parts by weight of a synthetic rubber EPDM, sheeting by using the twin roll became difficult and heat generated due to shearing increased.

Comparative Example 6

The mixture sheet and the molding plate were evaluated in exactly the same manner as in Example 3 except for using a small amount of a natural powdered leather (average grain size of 30 μm, 5 parts by weight).

Comparative Example 7

The mixture sheet and the molding plate were evaluated in exactly the same manner as in Example 4 except for using a small amount of a natural powdered leather (average grain size of 60 μm, 5 parts by weight).

Comparative Example 8

Evaluation was conducted in the same manner as in Example 3 except for preparing a mixture sheet by using 50 parts by weight of a gelation powder (average grain size of 30 μm) instead of the natural powdered leather and, subsequently, fabricating a molding plate of a predetermined shape.

Comparative Example 9

Evaluation was conducted in the same manner as in Example 1 except for manufacturing a molding plate from a sheetlike mixture by using only 80 parts by weight of the natural rubber (#3) and 20 parts by weight of the synthetic rubber EPDM (Keltan 314), without using the powdered leather.

Comparative Example 10

Various kinds of evaluations were conducted in the same manner as in Example 1 for the molding plate comprising 100 parts by weight of the synthetic rubber EPDM (Keltan 314).

Compositions and results of tests in the examples and comparative examples described above are shown in Table-1.

TABLE-1

Compositions and Results of Test of Examples and Control Examples

Rubber composition containing leather powder (parts by weight)

| | Natural rubber #3 | Synthetic rubber EPDM Keltan 314 | Synthetic rubber silicone rubber | *1 Natural leather powder (molecular weight about 300,000) Water washing | | | | | | Gelatin powder (average grain size: 30 um) | Powder falling at cut-end by cutter |
|---|---|---|---|---|---|---|---|---|---|---|---|
| | | | | performed | | | | not performed | | | |
| | | | | A | B | C | D | E | F | | |
| Example | | | | | | | | | | | |
| 1 | 50 | 50 | | 50 | | | | | | | no powder fall |
| 2 | 50 | 50 | | | 50 | | | | | | " |
| 3 | | 100 | | 50 | | | | | | | " |
| 4 | 100 | | | | 50 | | | | | | " |
| 5 | 80 | 20 | | | 25 | | | | | | " |
| 6 | | | 100 | | 50 | | | | | | " |
| 7 | 20 | 80 | | 350 | | | | | | | " |
| Control Example | | | | | | | | | | | |
| 1 | 50 | 50 | | | | | | 50 | | | no powder fall |
| 2 | | 100 | | | | | | | 50 | | " |
| 3 | 50 | 50 | | | | 50 | | | | | " |
| 4 | | 100 | | | | | 50 | | | | powder fall |
| 5 | 80 | 20 | | 450 | | | | | | | Sheet impossible to prepare |
| 6 | | 100 | | | 5 | | | | | | no powder fall |
| 7 | 100 | | | 5 | | | | | | | " |
| 8 | | 100 | | | | | | | | 50 | " |
| 9 | 80 | 20 | | | | | | | | | — |
| 10 | | 100 | | | | | | | | | — |

Performance test for molding plate

| | Moisture proof test 30° C., 95% RH, left for 24 hr. | Moisture absorption g/m², 23° C. 80% RH, left for 3 hr. | | *2 Dynamic friction coefficient kg | |
|---|---|---|---|---|---|
| | | polished | un-polished | polished | un-polished |
| Example | | | | | |
| 1 | no abnormality | 3.2 | 3.8 | 0.53 | 0.61 |
| 2 | " | 3.2 | 3.8 | 0.49 | 0.57 |
| 3 | " | 3.4 | 4.0 | 0.60 | 0.68 |
| 4 | " | 3.4 | 4.0 | 0.52 | 0.66 |
| 5 | " | 3.1 | 3.5 | 0.38 | 0.45 |
| 6 | " | 3.5 | 4.0 | 0.47 | 0.53 |
| 7 | " | 4.0 | 4.2 | 0.63 | 0.70 |
| Control Example | | | | | |
| 1 | white powder formed | 3.2 | 3.8 | 0.52 | 0.61 |
| 2 | white powder formed | 3.3 | 4.0 | 0.50 | 0.60 |
| 3 | no abnormality | 2.9 | 3.0 | 0.45 | 0.51 |
| 4 | " | 3.2 | 4.2 | 0.58 | 0.67 |
| 5 | | | | | |
| 6 | no abnormality | 1.7 | 2.2 | 0.28 | 0.32 |
| 7 | " | 1.8 | 2.1 | 0.27 | 0.30 |
| 8 | surface sticky | 3.0 | 3.5 | 0.51 | 0.55 |
| 9 | " | 0.8 | 1.1 | 0.25 | 0.29 |
| 10 | " | 0.9 | 1.2 | 0.26 | 0.31 |

*1: The kinds of natural leather powder A-F are as shown in Table-2
*2: Dynamic friction coefficient was according to JIS K 7125; Method of testing friction coefficient for plastic film and sheet (mating material: cotton muslin No. 3)

TABLE-2

| Powdered leather | A | B | C | D | E | F |
|---|---|---|---|---|---|---|
| Skin component (wt %) | 89 | 87 | 89 | 86 | 82 | 83 |
| Water extracted ion content (wt %) | 0.3 | 0.2 | 0.2 | 0.3 | 3.3 | 3.8 |
| Average grain size (μm) | 60 | 30 | 5 | 300 | 60 | 30 |

As can be seen from Table-1, Examples 1-7 showed no powder falling at the cut-end formed by a cutter (detachment of the powdered leather from the molding product) and caused no abnormality such as the occurrence of a white powder also in a humidity-proof test involving leaving the Examples in an atmosphere at 30° C., 95% RH for 24 hours. Further, the moisture absorption of the Examples after being left in an atmosphere at 23° C., 80% RH for 3 hours showed a value of greater than 3.1 g/cm$^3$ for the unpolished product and a value of greater than 3.5 g/cm$^3$ for the polished product and it can be said that they have a sufficient hygroscopic property, that is, a moisture releasing property. Further, also upon dynamic friction test, the dynamic friction coefficient was greater than 0.38 kg for the unpolished product and greater than 0.45 kg for the polished product, which can be considered to provide a satisfactory anti-slip effect. Further, if the powdered leather was not degreased, as in Example 2, there was no particular problem in view of the characteristics. However, degreasing is preferable in view of odors or the like.

On the other hand, Comparative Examples 1 and 2, lacking in the water washing treatment for the powdered leather, developed a white powder upon moisture proof test. Comparative Example 3, having the average grain size of the powdered leather as small as 5 μm, which was less than 10 μm as the lower limit, showed reduced moisture absorption both in the polished and unpolished products. Comparative Example 4, having the average grain size of the powdered leather as large as 300 μm, developed powder falling. In Comparative Example 5, the mixed amount of the powdered leather was as large as 450 parts by weight, so that it could not be molded into a sheet. In Comparative Examples 6 and 7, the mixed amount of the powdered leather was as little as 5 parts by weight, so that they showed reduced moisture absorption and low dynamic friction coefficient. Further, since the gelation powder was used instead of the powdered leather in Comparative Example 8, and the powdered leather was not mixed at all in each of Comparative Examples 9 and 10, stickiness occurred on the surface during the moisture proof test. Comparative Examples 9 and 10 also showed reduced moisture absorption and dynamic friction coefficient.

From the foregoing results, the examples according to the present invention have an effect of preventing the occurrence of the white powder as observed in the existent rubber compositions containing the powdered leather. Further, the rubber molding product containing the powdered leather gives no feeling of stickiness. Grips, for example, of rackets, handle bars, writing utensils and neck portions of stringed instruments made of such molding products are less slippy when gripped and thus provide satisfactory performance as sports goods, vehicle parts, writing utensils and musical instruments. Further, in the case of manufacturing medical gloves, caps, rubber shoes, instrument suspending belts, etc. with the rubber molding product containing the powdered leather, they do not come into close contact with a man's skin when the man sweats, so that they can be put off easily. Further, when the composition according to the present invention is used for manufacturing the surface materials of interior automotive trims, building materials, domestic electrical products and furniture, it provides higher quality products due to its leathery appearance, as well as improves a feeling of touching.

As has been described above, the present invention has an advantageous effect of providing a rubber composition containing a powdered leather and a molding product free from the occurrence of the white powder, and having enduring performance and quality of excellent surface property.

What is claimed is:

1. A rubber composition containing a powdered leather of a dispersion mixture comprising from 10 to 400 parts by weight of a powdered leather with a skin component of more than 75% by weight, a total amount of Na$^+$ ions and Ca$^{2+}$ ions extractable with water of less than 0.5% by weight and an average grain size D$_{50}$ of from 10 μm to 250 μm, and 100 parts by weight of rubber.

2. A rubber composition containing a powdered leather as defined in claim 1, wherein the content of oils and fats in the powdery leather material is less than 2% by weight.

3. A rubber composition containing a powdered leather as defined in claim 2, wherein the contents of oils and fats in the powdery leather material is less than 0.5% by weight.

4. A rubber molding product containing a powdered leather molded by mainly using a rubber composition containing a powdered leather of a dispersion mixture comprising from 10 to 400 parts by weight of a powdered leather with a skin component of greater than 75% by weight, a total amount of Na$^+$ ions and Ca$^{2+}$ ions extractable with water of less than 0.5% by weight and an average grain size D$_{50}$ of from 10 μm to 250 μm, and 100 parts by weight of rubber.

5. A rubber molding product containing a powdered leather as defined in claim 4, wherein the powdered leather is dispersed in dots in the molding product.

6. A process for producing a rubber composition containing a powdered leather which comprises the steps of: subjecting a raw material for powdered leather to coarse pulverization, water washing and dewatering so that said raw material is formed as a coarse powder having a skin component of greater than 75% by weight, a total amount of free Na$^+$ ions and free Ca$^{2+}$ ions of less than 0.5% by weight and a water content of from 65 to 70%, drying, powderizing and classifying the coarse powder so that the coarse powdered leather has an average grain size D$_{50}$ of from 10 μm to 250 μm, and dispersing and mixing from 10 to 400 parts by weight of the coarse powdered leather with 100 parts by weight of rubber.

7. A process for producing a rubber composition containing a powdered leather as defined in claim 6, wherein drying, degreasing by a solvent and removal of the residual solvent are performed between the steps of coarse pulverization and water washing to thereby remove oils and fats in the powdered leather.

8. A process for producing a rubber composition containing a powdered leather as defined in claim 6, wherein the water washing step is performed before degreasing or after powderization.

9. A process for producing a rubber composition containing a powdered leather as defined in claim 6, wherein the rubber is synthetic rubber and/or natural rubber.

10. A process for producing a rubber composition containing a powdered leather as defined in claim 6, wherein the coarsely powderized powdered leather after the drying step has a water content of less than 3% by weight.

* * * * *